(12) United States Patent
Glaeske et al.

(10) Patent No.: US 9,772,753 B2
(45) Date of Patent: Sep. 26, 2017

(54) DISPLAYING DIFFERENT VIEWS OF AN ENTITY

(71) Applicant: Microsoft Technology Licensing, LLC, Redmond, WA (US)

(72) Inventors: Brian R. Glaeske, Fargo, ND (US); Ray J. Ridl, Fargo, ND (US); Anne Gerssen, Copenhagen (DK); Michael M. Santos, Seattle, WA (US); Christopher R. Garty, Fargo, ND (US); Anastasia Paushkina, Redmond, WA (US); Crystal Gilson, Fargo, ND (US); Kevin M. Honeyman, Fargo, ND (US); Prasant Sivadasan, Sammamish, WA (US); Julie B. Hagen, Fargo, ND (US); Adrian L. Orth, West Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 13/913,035

(22) Filed: Jun. 7, 2013

(65) Prior Publication Data
US 2014/0365939 A1 Dec. 11, 2014

(51) Int. Cl.
*G06F 3/0484* (2013.01)
*G06Q 10/10* (2012.01)
*G06Q 10/06* (2012.01)

(52) U.S. Cl.
CPC ........... *G06F 3/0484* (2013.01); *G06Q 10/06* (2013.01); *G06Q 10/10* (2013.01)

(58) Field of Classification Search
CPC .... G06F 17/18; G06F 17/30; G06F 17/30554; G06F 17/30572; G06F 3/0484; G06Q 10/04; G06Q 10/10

USPC ........ 715/771–772, 784–787, 792, 804–807, 715/830
See application file for complete search history.

(56) References Cited

U.S. PATENT DOCUMENTS

| 5,317,306 | A | * | 5/1994 | Abraham et al. ............. 345/684 |
| 8,001,487 | B2 | * | 8/2011 | Koppert ........................ 715/830 |
| 8,185,827 | B2 | * | 5/2012 | Appleyard .......... G06F 17/3089 715/751 |
| 2003/0217074 | A1 | | 11/2003 | Wallace |
| 2004/0193480 | A1 | | 9/2004 | Pinsonnault et al. |
| 2005/0091263 | A1 | * | 4/2005 | Wallace ........................ 707/102 |
| 2005/0245249 | A1 | | 11/2005 | Wierman et al. |
| 2006/0117051 | A1 | * | 6/2006 | Chin ..................... G06F 17/245 |

(Continued)

OTHER PUBLICATIONS

"SPME Intelligent Business", Retrieved at <<http://www.sybaseproducts.com/PublicFiles/File/Intelligent_Business.pdf>> Retrieved Date: Mar. 25, 2013, pp. 12.

(Continued)

*Primary Examiner* — Andrew Tank
(74) *Attorney, Agent, or Firm* — Christopher R. Christenson; Kelly, Holt & Christenson, PLLC

(57) ABSTRACT

An entity hub display includes a plurality of different sections, each section including a plurality of different components. The sections each correspond to a different aspect of data that makes up an entity. Each component is a user interface display element that is related to data within the corresponding section. The individual components can be selected and placed on the entity hub display based on a user's role and activities or tasks performed by a user in that role.

12 Claims, 16 Drawing Sheets

(56) References Cited

U.S. PATENT DOCUMENTS

| | | | |
|---|---|---|---|
| 2007/0234290 | A1 | 10/2007 | Ronen et al. |
| 2009/0070151 | A1 | 3/2009 | Sellari |
| 2009/0265611 | A1* | 10/2009 | Sengamedu ...... G06F 17/30905 715/234 |
| 2011/0113365 | A1* | 5/2011 | Kimmerly et al. ........... 715/806 |
| 2011/0289161 | A1 | 11/2011 | Rankin, Jr. et al. |
| 2011/0313805 | A1* | 12/2011 | Heydemann ........... G06Q 10/06 705/7.14 |
| 2012/0239703 | A1 | 9/2012 | Blight et al. |
| 2013/0046570 | A1 | 2/2013 | Miller et al. |
| 2014/0143701 | A1* | 5/2014 | Hoyer ........................... 715/772 |

OTHER PUBLICATIONS

"Manufacturing Business Intelligence", Retrieved at <<http://www.criticalmanufacturing.com/services/MBI_Custom/>> Retrieved Date: Mar. 25, 2013, pp. 2.

"SAS® MDM Advanced", Retrieved at <<http://www.sas.com/software/data-management/mdm-advanced/index.html#section=4>> Mar. 25, 2013, pp. 3.

Rouse, Margaret, "Business Intelligence Dashboard", Retrieved at <<http://searchbusinessanalytics.techtarget.com/definition/business-intelligence-dashboard>> Jun. 15, 2010, pp. 12.

Matters, Merit, "Microsoft Dynamics AX versus SAP All-in-One: Role Tailored Design", Retrieved at <<hptp://www.meritsolutions.com/meritmatters/index.php?/archives/334-Microsoft-Dynamics-AX-versus-SAP-All-in-One-Role-Tailored-Design.html>> Mar. 26, 2010, pp. 4.

"MDM for Business Intelligence", Retrieved at <<http://www.orchestranetworks.com/mdm-for-business-intelligence/mdm-for-business-intelligence.html>> Retrieved Date Mar. 25, 2013, pp. 2.

Richards, Josh, "Microsoft Dynamics AX Role Tailored User Interface Provides Insight and Productivity", Retrieved at <<http://community.dynamics.com/ax//b/meritmatters/archive/2012/12/07/microsoft-dynamics-ax-role-tailored-user-interface-provides-insight-and-productivity.aspx>> Dec. 7, 2012, pp. 2.

International Search Report and Written Opinion for International Application No. PCT/US 14/40778, mailing date: Mar. 13, 2015, filing date: Jun. 4, 2014, 10 pages.

"Dashboard (business)", Retrieved from <<https://en.wikipedia.org/w/index.php?title=Dashboard_%28business%29&oldid=557448116>>, May 30, 2013, 4 Pages.

"Office Action Issued in European Patent Application No. 14736123.2" Mailed Date: Nov. 23, 2016, 6 Pages.

* cited by examiner

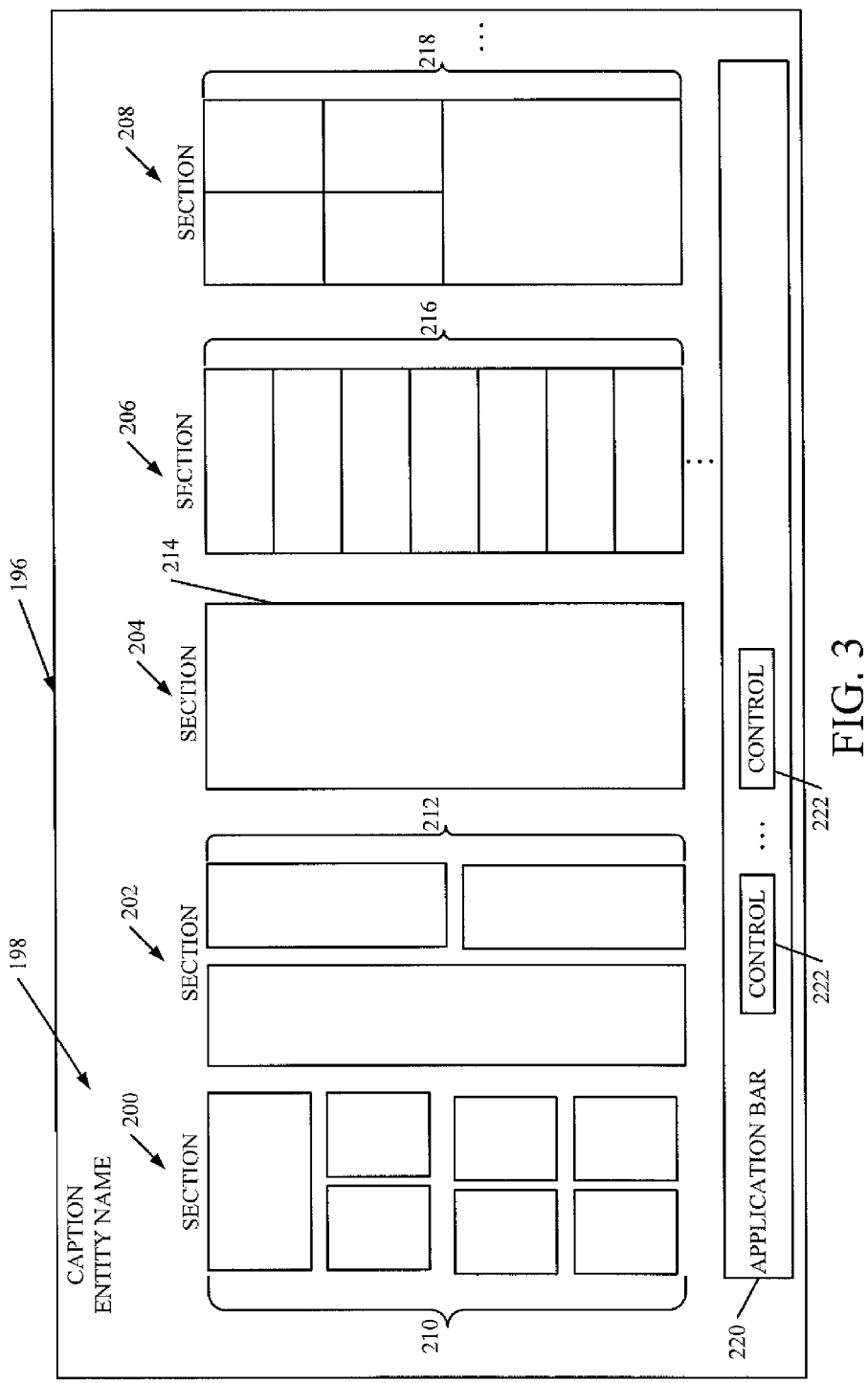

DISPLAYING DIFFERENT VIEWS OF AN ENTITY

BACKGROUND

Computer systems are very common today. In fact, they are in use in many different types of environments.

Business computer systems are also in wide use. Such business systems include customer relations management (CRM) systems, enterprise resource planning (ERP) systems, line-of-business (LOB) systems, etc. These types of systems often include business data that is stored as entities, or other business data records. Such business data records (or entities) often include records that are used to describe various aspects of a business. For instance, they can include customer records that describe and identify customers, vendor records that describe and identify vendors, sales records that describe particular sales, quote records, order records, inventory records, etc. Each entity, itself, can include a great deal of information. It can also be the subject of communications from various users. In addition, each entity can include different types of views to underlying data. For instance, it can include charts, activity feeds, lists, etc.

The business systems also commonly include process functionality that facilitates performing various business processes or tasks on the data. Users log into the business system in order to perform business tasks for conducting the business.

Such business systems also currently include roles. Users are assigned one or more roles, based upon the types of tasks they are to perform for the business. The roles can include certain security permissions. Also, access to different types of data records (or entities) can vary, based on a given role.

Business systems can also be very large. They can contain a great number of data records (or entities) that can be displayed or manipulated through the use of thousands of different forms. Therefore, visualizing the data in a meaningful way can be very difficult.

The discussion above is merely provided for general background information and is not intended to be used as an aid in determining the scope of the claimed subject matter.

SUMMARY

An entity hub display includes a plurality of different sections, each section including a plurality of different components. The sections each correspond to a different aspect of data that makes up an entity. Each component is a user interface display element that is related to data within the corresponding section. The individual components can be selected and placed on the entity hub display based on a user's role and activities or tasks performed by a user in that role.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a block diagram showing various components that can be included on an entity hub display.

DETAILED DESCRIPTION

Figure 1:
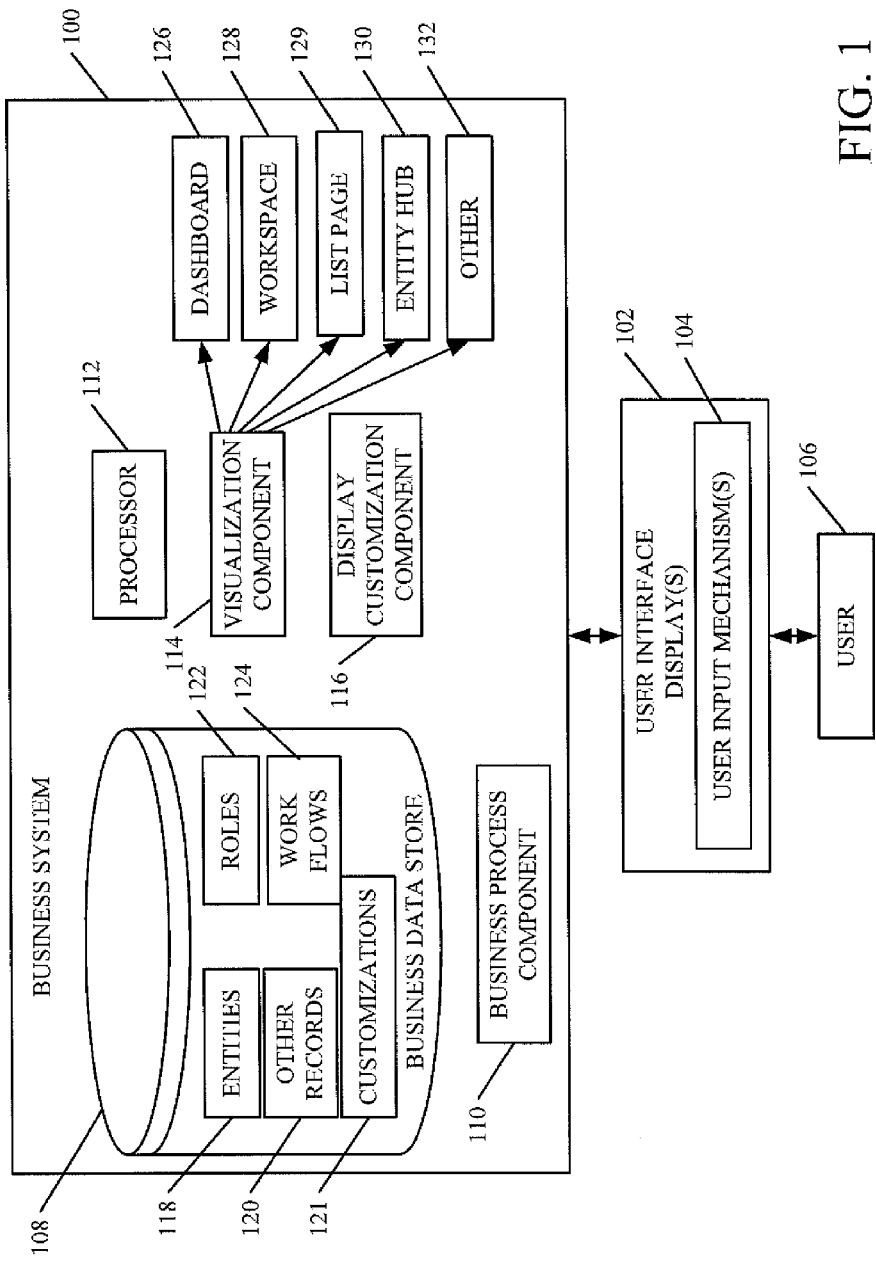
FIG. 1 is a block diagram of one illustrative business system.

FIG. 1 is a block diagram of one embodiment of business system 100. Business system 100 generates user interface displays 102 with user input mechanisms 104 for interaction by user 106. User 106 illustratively interacts with the user input mechanisms 104 to control and manipulate business system 100.

Business system 100 illustratively includes business data store 108, business process component 110, processor 112, visualization component 114 and display customization component 116. Business data store 108 illustratively includes business data for business system 100. The business data can include entities 118 or other types of business records 120. It can include customizations 121 that represent user customizations to various displays. It also includes a set of roles 122 that can be held by various users of the business data system 100. Further, business data store 108 illustratively includes various workflows 124. Business process component 110 illustratively executes the workflows 124 on entities 118 or other business data 120 records, based on user inputs from users that each have one or more given roles 122.

Visualization component 114 illustratively generates various visualizations, or views, of the data and processes (or workflows) stored in business data store 108. The visualizations can include, for example, one or more dashboard displays 126, a plurality of different workspace displays 128, a plurality of list page displays 129, a plurality of different entity hub displays 130, and other displays 132.

Dashboard display 126 is illustratively an overview of the various data and workflows in business system 100. It illustratively provides a plurality of different links to different places within the application comprising business system 100.

Workspace display 128 is illustratively a customizable, activity-oriented display that provides user 106 with visibility into the different work (tasks, activities, data, etc.) performed by user 106 in executing his or her job. The workspace display 128 illustratively consolidates information from several different areas in business system 100 (e.g., in a business application that executes the functionality of business system 100) and presents it in an organized way for visualization by user 106.

List page display 129 breaks related items out into individual rows, whereas workspace display 128 can have an individual element that summarizes the rows of a list page display 129. For example, a tile (discussed below) on a workspace display 128 can display a count of the number of rows in a corresponding list page display 129. As another example, a list (also discussed below) on a workspace display 128 can show data from a list page display 129, but with a smaller set of columns than the full list page display 129. A workspace display 128 can also have multiple elements (e.g., a tile, a list, a chart, etc.) that each point to a different list page display 129.

Entity hub display 130 is illustratively a display that shows a great deal of information about a single data record (such as a single entity 118 or other data record 120, which may be a vendor record, a customer record, an employee record, etc.). Thus, there can be an entity hub display for each entity 118 or other data record 120. The entity hub display 130 illustratively includes a plurality of different sections of information, with each section designed to present its information in a given way (such as a data field, a list, etc.) given the different types of information presented in each section.

Users can illustratively actuate individual display elements (e.g., components) within each section to drill deeper into even more entity data. The entity hub display 130 is illustratively a panoramic display that is horizontally scrollable to allow sections that are beyond the confines of the viewable screen to be scrolled into view. In one embodiment, users can do both relatively simple and relatively complex editing tasks from entity hub display 130, and they can also illustratively create new entities as well. In one embodiment, the information provided on entity hub display 130 is filtered based on a role that a given user is assigned. This is described in greater detail below.

Business process component 110 illustratively accesses and facilitates the functionality of the various workflows 124 that are preformed in business system 100. It can access the various data (such as entities 118 and other business records 120) stored in data store 108, in facilitating this functionality as well.

Display customization component 116 illustratively allows user 106 to customize the displays that user 106 has access to in business system 100. For instance, display customization component 116 can provide functionality that allows user 106 to customize one or more of the workspace displays 128 or entity hub displays 130 that user 106 has access to in system 100.

Processor 112 is illustratively a computer processor with associated memory and timing circuitry (not separately shown). It is illustratively a functional part of business system 100 and is activated by, and facilitates the functionality of, other components or items in business system 100.

Data store 108 is shown as a single data store, and is local to system 100. It should be noted, however, that it can be multiple different data stores as well. Also, one or more data stores can be remote from system 100, or local to system 100, or some can be local while others are remote.

User input mechanisms 104 can take a wide variety of different forms. For instance, they can be text boxes, active tiles, check boxes, icons, links, dropdown menus, or other input mechanisms. In addition, they can be actuated by user 106 in a variety of different ways as well. For instance, they can be actuated using a point and click device (such as a mouse or trackball) using a soft or hard keyboard, a thumbpad, various buttons, a joystick, etc. In addition, where the device on which user interface displays are displayed has a touch sensitive screen, they can be actuated using touch gestures (such as with a user's finger, a stylus, etc.). Further, where the device or system includes speech recognition components, they can be actuated using voice commands.

It will also be noted that multiple blocks are shown in FIG. 1, each corresponding to a portion of a given component or functionality performed in system 100. The functionality can be divided into additional blocks or consolidated into fewer blocks. All of these arrangements are contemplated herein.

In one embodiment, each user 106 is assigned a role 122, based upon the types of activities or tasks that the given user 106 will perform in business system 100. Thus, in one embodiment, dashboard display 126, workspace display 128 or entity hub display 130 (or all of them) are generated to provide information related to the role of a given user 106. That is, user 106 is provided with different information on a corresponding display 126, 128, or 130 based upon the particular role or roles that are assigned to user 106 in business system 100. In this way, user 106 is presented with a visualization of information that is highly relevant to the job being performed by user 106 in business system 100.

In addition, some types of roles 122 may have multiple corresponding workspace displays 128 or entity hub displays 130 generated for them. By way of example, assume that user 106 is assigned an administrator's role in business system 100. In that case, user 106 may be provided with access to multiple different workspace displays 128. A first workspace display 128 may be a security workspace. The security workspace may include information related to security features of business system 100, such as access, permissions granted in system 100, security violations in system 100, authentication issues related to system 100, etc. User 106 (being in an administrative role) may also have access to a workspace display 128 corresponding to the health of system 100. This workspace display 128 may include information related to the performance of system 100, the memory usage and speed of system 100, etc. Thus, a given user 106 that has only a single role 122 may have access to multiple different workspace displays 128. The same can be true of entity hub displays 130. That is, in one embodiment, different entity hub displays 130 can be generated for a single entity, based on the user's role 122.

Similarly, a given user 106 may have multiple different roles 122. By way of example, assume that a given user 106 is responsible for both the human resources tasks related to business system 100, and payroll tasks. In that case, the given user 106 may have a human resources role 122 and a payroll role 122. Thus, user 106 may have access to one or more workspace displays 128 for each role 122 assigned to user 106 in business system 100. In this way, when user 106 is performing the human resources tasks, user 106 can access the human resources workspace display 128 which will contain all of the information user 106 believes is relevant to the human resources role and the human resources tasks. Then, when user 106 is performing the payroll tasks in system 100, user 106 can access one or more payroll workspace displays 128 which contain the information relevant to the payroll tasks and role. Again, the same is true for entity hub displays 130. That is, a different entity hub display 130 can be generated for a given entity, based on the role 122 of the user 106 that requested the display. In this way, the user need not have just a single display with all of the information related to both the payroll tasks and the human resources tasks on the single display, which can be confusing and cumbersome to work with.

Figure 2A:
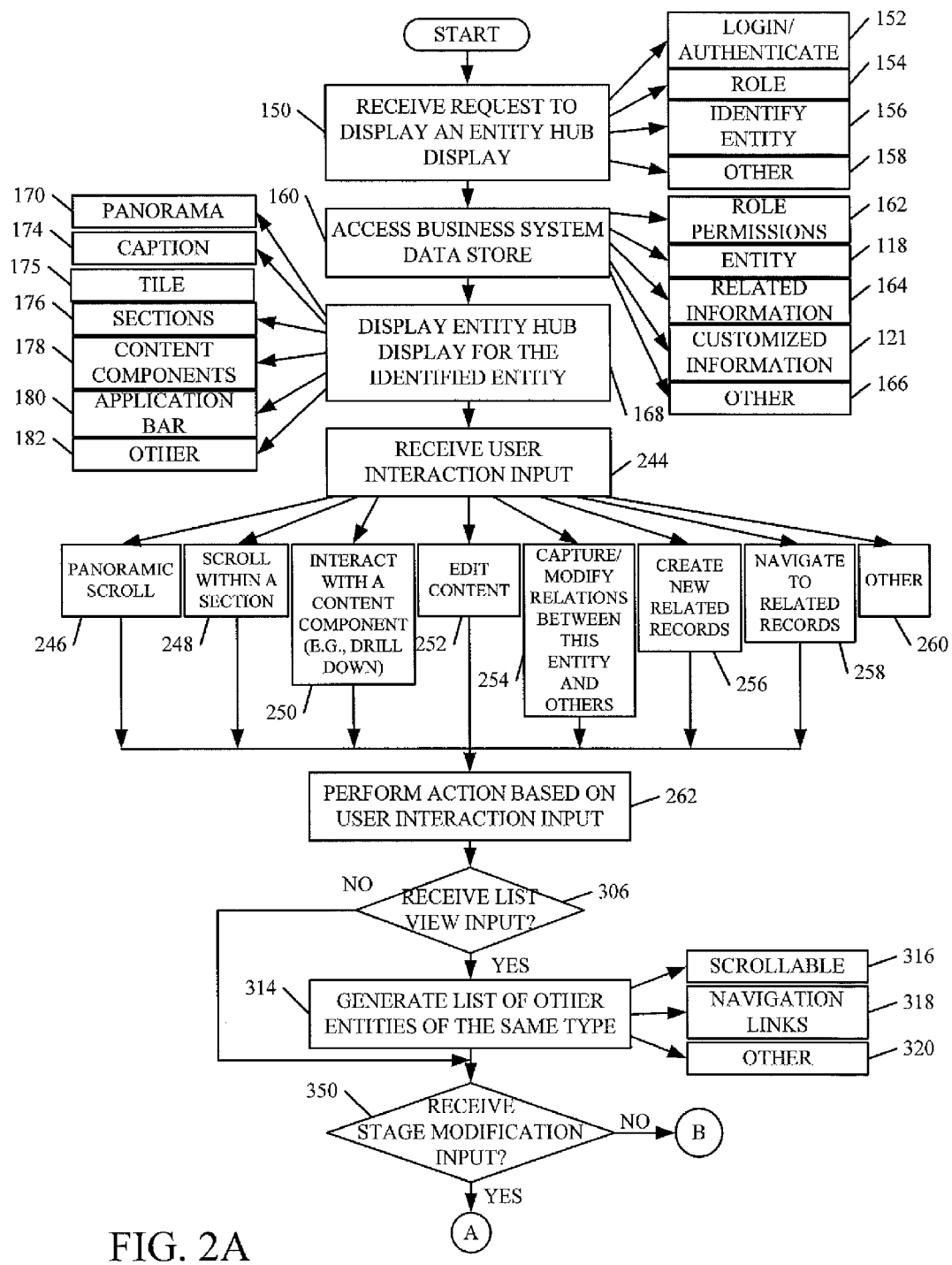
FIGS. 2A and 2B (collectively FIG. 2) show a flow diagram illustrating one embodiment of the overall operation of the system shown in FIG. 1, in generating and manipulating an entity hub display.
Figure 2B:
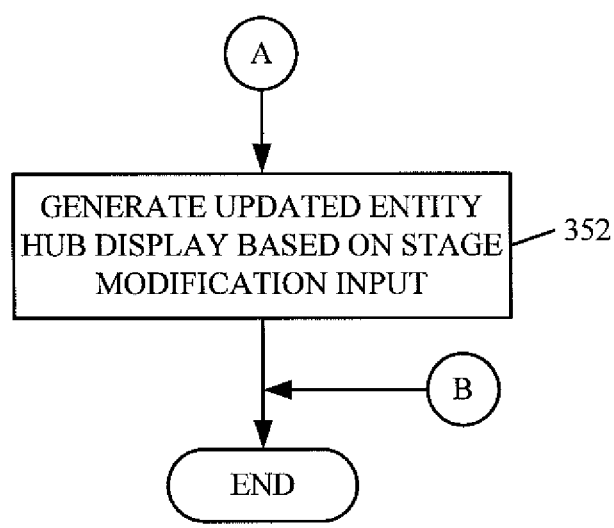

FIG. 2 (FIGS. 2A and 2B are collectively referred to as FIG. 2) is a flow diagram illustrating one embodiment of the operation of system 100 in generating and manipulating various entity hub displays 130. Visualization component 114 first generates a user interface display that allows a user to log into business system 100 (or otherwise access business system 100) and request access to an entity hub display 130 for one or more entities corresponding to the role or roles 122 assigned to user 106. Generating the UI display to receive a user input requesting an entity hub display 130 is indicated by block 150 in FIG. 2.

This can include a wide variety of different things. For instance, user 106 can provide authentication information 152 (such as a user name and password), or a role 154 (or the role can be automatically accessed within system 100 once the user provides authentication information 152). In addition, user 106 can provide an input identifying a particular entity (as indicated by block 156) for which the entity hub display 130 is to be shown. Of course, the user 106 can navigate to, or request access to, an entity hub display 130 in other ways as well, and this is indicated by block 158.

In response to receiving the input to request access to an entity hub display 130, visualization component 114 accesses business data store 108. This is indicated by block 160 in FIG. 2. Visualization component 114 can illustratively access role permissions associated with roles 122. This is indicated by block 162. It can of course access entities 118 (or other records 120), any information related to entities 118 (or other records 120), as indicated by block 164, and it can access customizations or customized information 121. Customized information 121 can be used to customize an entity hub display 130, based on previous user customizations, that are stored as customization information 121. Of course, visualization component 114 can also access other information in data store 108. This is indicated by block 166 in FIG. 2.

Visualization component 114 then displays the entity hub display 130 for the entity that was identified by the user in the request for the display. This is indicated by block 168. The particular entity hub display 130 can be displayed in a panoramic view. This is indicated by block 170. By panoramic, it is meant that the display can exceed the horizontal size of the particular display screen on which the display is being shown. The entity hub display 130 is thus illustratively a horizontally (or panoramically) scrollable so that the user can scroll the display to see all of the information on the display.

In addition, the display illustratively has a caption 174 and a title 175. The caption 174 identifies the particular type of entity for which the entity hub display 130 is being generated. By way of example, if the entity hub display 130 is for a particular vendor entity, the caption may include the word "vendor" to indicate that the type of entity for which the display is being shown is a "vendor" entity. The title identifies the specific entity (e.g., the specific vendor entity) represented by the entity hub display 130.

As briefly discussed above, the entity hub display 130 can be broken into a plurality of sections 176, each with one or more content components 178. Each section 176 illustratively includes a summary of a part of an entity. The summary can include a brief abstract, a recapitulation, or a compendium, of the facts about that particular part of the entity, tailored to the user's role 122. Each section 176 illustratively provides information about a particular facet of the entity.

The content components 178 illustratively include user actuable interface elements that can be actuated by user 106 to access other information. For instance, activating a component 178 can navigate the user to more detailed information. This allows the user to drill down into even greater detail about a given entity. In addition, some sections allow the user to perform editing or to perform a task or activity relative to the entity represented by the entity hub display 130.

The entity hub display 130 also illustratively includes an application bar 180 that includes action buttons that allow user 106 to take action. The action buttons can be contextual to the specific entity represented by the entity hub display 130 and to the user or role 122 assigned to the user 106 viewing the entity hub display 130.

Of course, the entity hub display 130 can include other information as well. This is indicated by block 182 in FIG. 2.

FIG. 3 is a block diagram showing exemplary items of an exemplary entity hub display 196. In one embodiment, the entity hub display 196 includes caption 174 that identifies the entity type. The display 196 also includes a title portion 175 that shows a title of the specific entity represented by display 196. Entity hub display 196 illustratively includes a plurality of sections 200, 202, 204, 206 and 208, and each section has one or more content components 210, 212, 214, 216 and 218. Each section 200-208 illustratively corresponds to a part of the entity represented by entity hub display 196. For example, section 200 may be a first section that shows a collection of tiles that provide quick access to highly relevant information in (or about) the underlying entity. The highly relevant information can be information that is frequently used by users viewing the display 196. The second section 202 can be a role tailored section that shows highly relevant (or frequently accessed) information for this particular user 106 or related to the tasks preformed by the role 122 assigned to user 106. By way of example, if there are three different roles that view the entity hub display 196, the information in section 202 can be tailored to the specific role of the person viewing it. If the person has a role of purchasing manager, for example, then the information in section 202 can be purchasing information.

The remaining sections of the entity hub display 196 illustratively contain a summary of the remaining parts of the entity, in descending order of importance to the particular person (or role) viewing the display 196. The most important information is illustratively on the left, while the least important information is on the right.

Of course, these are exemplary sections and they can be related to substantially any part of the underlying entity. Each of the components 210-218 illustratively correspond to an item of data from the underlying entity or to a task or activity that is related to the role 122 assigned to user 106.

FIG. 3 also shows that entity hub display 196 includes an application bar 220. Application bar 220 is provided with a set of controls 222 that can be contextual to the specific entity being displayed. The controls 222 can allow the user to perform a variety of different actions, such as to change the kind of view being displayed, to filter information on the view, to share, export or edit the information, or even to perform user-defined actions. These are exemplary actions, and others can be provided for through controls 222 on application bar 220 as well.

It should also be noted that the width of each of sections 200-208 on display 196 can vary. In one embodiment, the width varies based upon the importance of the information in the given section. For instance, if the information in a given section is deemed highly important, it can be allocated more horizontal real-estate on the display 196 than information that is deemed less important. This can be done on an entity-by-entity basis, based on user preferences or user customization inputs, based on the user's role, or based on other criteria, or it can even be predefined.

Figure 3A:
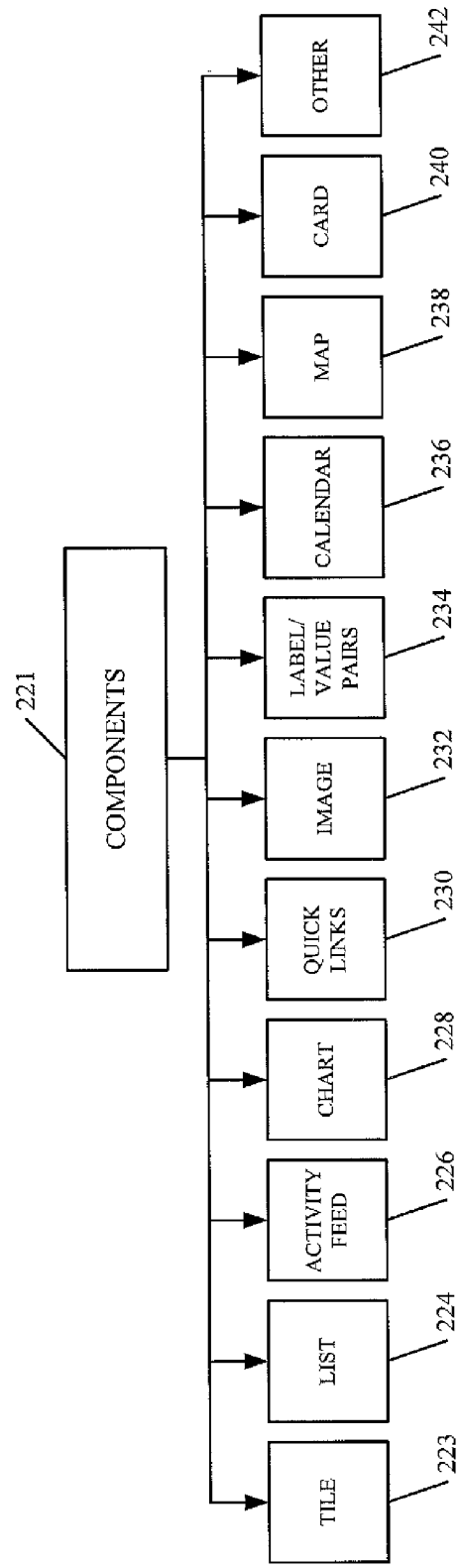
FIG. 3A is a block diagram of one illustrative entity hub display.

FIG. 3A is a block diagram showing one embodiment of examples of different components 221. FIG. 3A shows that any given component 221 can be a tile 223, a list 224, an activity feed 226, a chart 228, one or more quick links 230, an image 232, label/value pairs 234, a calendar 236, a map 238, a card 240, or another user interface element 242. Some of these components can have a variety of different forms.

Once an entity hub display (such as display 196 shown in FIG. 3) is displayed for user 106, user 106 can illustratively interact with the display (by providing a user interaction input) to see a different part of the display, or more detailed information, or to navigate to other displays, or to perform an action, etc. Receiving a user interaction input on the entity hub display is indicated by block 244 in FIG. 2. A number of examples of user interaction inputs will now be described.

In one embodiment, the entity hub display 130 is a panoramic display. That is, if there is more information in the entity hub display 130 than can be displayed on a single screen, the screen can be panned to the left or to the right in order to expose and display the additional information. For example, if the entity hub display 130 is displayed on a touch sensitive screen, the user can simply pan the display to the left or to the right using a swipe touch gesture. In this way, the user can scroll horizontally (or panoramically) to view all of the various sections on the entity hub display 130. Receiving a panoramic scroll input, to scroll panoramically through the sections in an entity hub display 130, is indicated by block 246 in FIG. 2.

In one embodiment, the components in each section can be scrolled vertically as well. For instance, and referring again to FIG. 3, if the number of components 216 in section 206 exceeds the space available to it, the user can illustratively scroll the list vertically (independently of the other sections) to expose and display 130 additional components in the section. Scrolling within a section is indicated by block 248 in FIG. 2.

Further, the user can interact with the entity hub display by actuating one of the components in one of the sections. When the user does this, the user is illustratively navigated (i.e., the user drills down) to a display that shows more detailed information represented by that particular component. Interacting with a component to drill down to more detailed information is indicated by block 250 in FIG. 2.

In addition, user 106 can illustratively edit the content displayed within a given section or component. This is indicated by block 252 in FIG. 2. By way of example, the user 106 can actuate one of the controls 222 on the application bar 220 in order to place a selected component or section in edit mode, so that the user can edit the content.

Also, in one embodiment, user 106 can capture or modify relations between the underlying entity represented by to the displayed entity hub display 130 and other entities. This is indicated by block 254 in FIG. 2. For instance, entities may be associated with one another or otherwise related to one another in different ways. The user can illustratively use one of controls 222 on application bar 220 (or other controls) to capture these associations or relations, or to modify them by adding or deleting relations to other entities.

Further, user 106 can illustratively create new, related business records or entities. Such business records or entities are illustratively related to the underlying entity represented by the particular entity hub display 130 being shown. Creating new or related records is indicated by block 256.

User 106 can also illustratively navigate to related records. This is indicated by block 258. By way of example, it may be that some items of the information on the entity hub display 130 links to other entities or other types of business records. When the user 106 actuates a link, the user 106 can illustratively be navigated to that related entity.

Of course, it will be appreciated that user 106 can perform other interactions with the entity hub display 130, and other actions will be taken. This is indicated by block 260 in FIG. 2.

Once the user has provided the user interaction input as indicated by block 244, visualization component 114 illustratively performs the corresponding action based on the user interaction input. This is indicated by block 262 in FIG. 2. For instance, the visualization component can navigate the user, show more detailed information, add or modify relations or generate new business records, or react in another desired way, based upon the particular interaction user input.

Figure 3B:
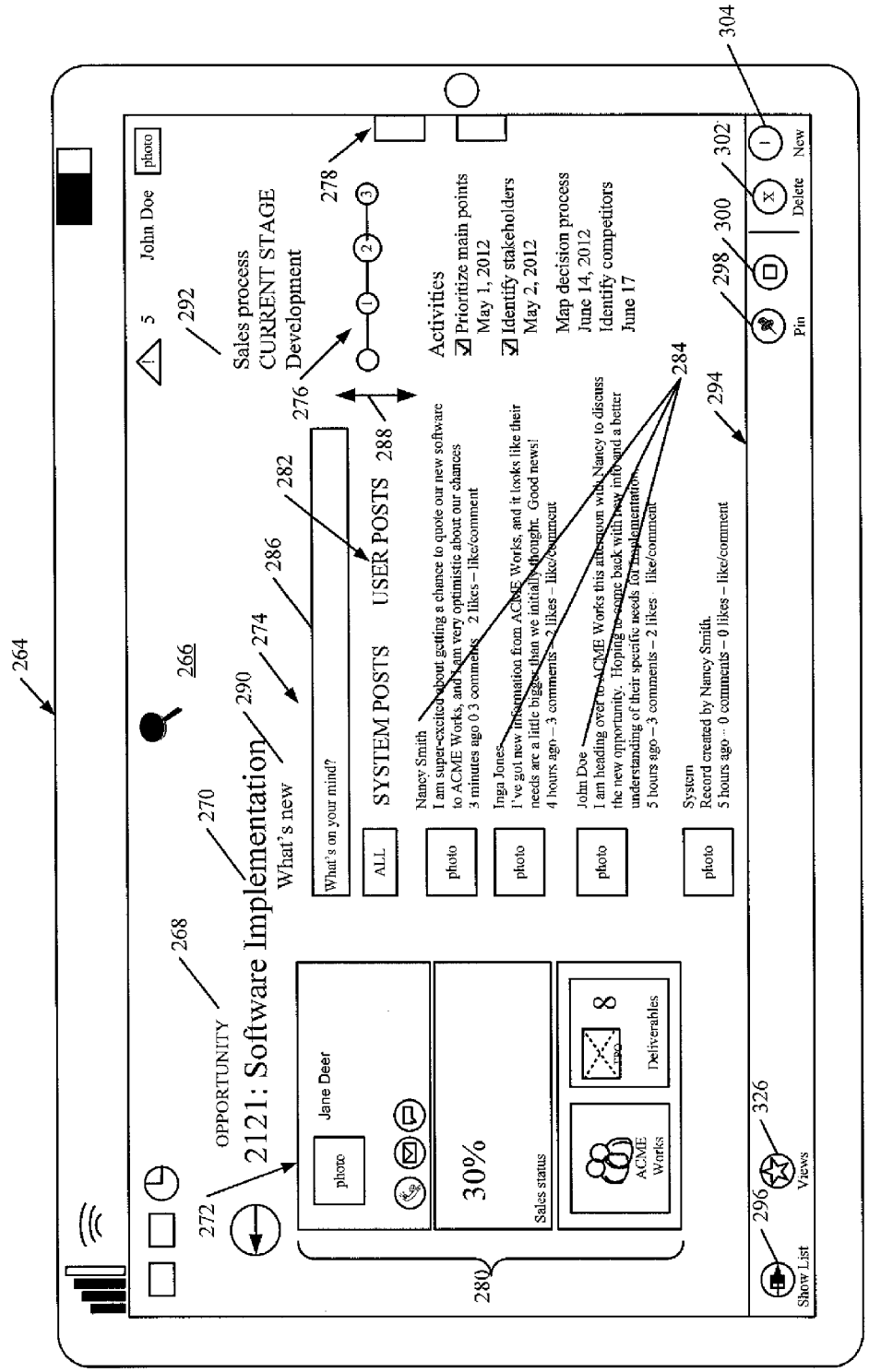
FIGS. 3B-3D are illustrative user interface displays.

FIG. 3B shows one embodiment of a user interface display 264 that shows an entity hub display 266. Entity hub display 266 illustratively includes caption 268, title section 270, relevant information section 272, what's new section 274, sales process section 276, and other sections 278 (which are off screen to the right on user interface display 264). The other sections 278 can illustratively be viewed if user 106 pans the display using a panoramic navigation input to move the display to the right or to the left, on the display screen.

Each of sections 272-278 illustratively includes a set of components. Group 272 illustratively includes tiles 280. When actuated by user 106, each of tiles 280 illustratively navigates user 106 to an underlying detailed display that represents more detailed information corresponding to the specific tile 280 that was actuated by user 106. Each tile 280 is illustratively a single click or touch target. The tile surface is dynamic and may be frequently updated with new content from the underlying data.

What's new section 274 illustratively includes an activity feed 282. Activity feed 282 displays a continuous flow of collaboration and activity related information. In the embodiment shown in FIG. 3B, activity feed 282 illustratively includes a list of items 284. The list reflects the collaboration and activity related information in the form of a plurality of posts. Activity feed 282 also illustratively includes text box 286 that can receive a textual user input from user 106. When the user types a post into box 286 and actuates a post button (or other suitable user input mechanism) the textual entry in box 286 is posted to the list of items 284 in activity feed 282 for review by others who receive the activity feed. It will also be noted that, if the number of items 284 in the activity feed exceed the vertical workspace available for displaying them, then user 106 can illustratively scroll vertically in the directions indicated by arrow 288. This can be done using an appropriate user input, such as a touch gesture, a point and click input, etc.

FIG. 3B also shows that sections 274 and 276 each include a header 290 and 292, respectively. In one embodiment, each of the headers can be used to link the user to more detailed information related to that section. For example, in section 274, actuating header 290 navigates user 106 to a more complete list of the same types of information. The page showing the more detailed information illustratively includes a back button. When the user actuates the back button, the user is navigated back to the entity hub display, with the scroll state of the entity hub display being maintained.

FIG. 3B also includes application bar 294. Application bar 294 includes a set of user actuatable controls including a show list control 296, a pin control 298, an opportunity control 300, a delete control 302, a new control 304 and a views control 326. Show list control 296 and views control 326 are described in greater detail below with respect to FIG. 3C. Pin control 298 illustratively allows the user to create a shortcut to the particular instance of the data being shown on the entity hub display 266. In one embodiment, one or more controls can be actuated to cause display customization component 116 to navigate the user to one or more user interface displays that allow the user to add additional information from the underlying entity to the entity hub display 266. By way of example, the user can be presented with additional detail (not currently represented on the entity hub display) for a selected section so that the user can add that detail to a given section. In addition, the user can illustratively change the type of display format for a given section, or for a given component within a section.

If the user actuates the opportunity control 300, the user can illustratively be navigated to additional information about the present opportunity, or to see a full detailed view of the present opportunity, etc.

If the user actuates the delete control 302, the user can illustratively delete a current entity record being displayed. Or, if a section is selected, the user can delete a selected component (or data) within the selected section. Of course, the user can also illustratively delete the entire entity hub display 266 as well.

If the user actuates the new control 304, the user can illustratively create a new entity. In one embodiment, the newly created entity can also be associated with (or otherwise related to) the underlying entity which is represented by entity hub display 266.

The user can also illustratively reorder the sections on the entity hub display 266, or the individual components within a section of the entity hub display 266. In one embodiment, the user can simply select a section or an individual component and use a drag and drop input in order to drag it to its new location. In that case, display customization component 116 illustratively reflows the display of information on the entity hub display to reorder the components or sections as desired by the user.

The user 106 can also change the mode of the display of entity hub display 266 to a list view by actuating show list control 296. Receiving the user input actuating show list control 296 is indicated by block 306 in FIG. 3B. When this occurs, visualization component 114 generates a list view user interface display such as display 308 shown in FIG. 3C. List view display 308 is similar to the entity hub display 266 shown in FIG. 3B, and similar items are similarly numbered. However, it can be seen that list view display 308 also includes a list 310. List 310 illustratively includes a list of all entities corresponding to the type of entity displayed in entity hub display 266 and indicated by caption 268.

By way of example, it can be seen from the caption 268 in FIG. 3B that the entity represented by entity hub display 266 is an "opportunity" entity. Therefore, when the user actuates show list control 296, list 310 is generated and displayed. List 310 includes a list of all "opportunity" entities. Each of these opportunity entities is represented by an entry 312 in list 310. The entries are illustratively user actuable interface elements (such as a navigation link). When the user actuates one of entries 312, visualization component 114 navigates the user to an entity hub display corresponding to the entity represented by the specific entry 312 in list 310 that was actuated by user 106. Generating the list 310 of other entities of the same type is indicated by block 314 in the flow diagram of FIG. 2.

It will also be noted that, in one embodiment, the list 310 is scrollable in the vertical direction. This is indicated by block 316 in the flow diagram of FIG. 2. That is, if the number of entries 312 exceeds the vertical area on which they are displayed, the user can illustratively scroll list 310 vertically upward and downward by using a suitable user input. Displaying each of the entries 312 in list 310 as a navigation link is indicated by block 318 in FIG. 2.

List 310 can include other information as indicated by block 320. It can be seen, for instance, that list 310 also illustratively includes a filter text box 322. The user can illustratively type filter criteria into text box 322 to filter the list 310 of entities based on the filter criteria. Further, list 310 illustratively includes a sort criteria mechanism 324. In the embodiment shown in FIG. 3C, mechanism 324 is a dropdown menu. When the user actuates the mechanism 324, a dropdown menu is generated that displays various sort criteria that can be used to sort the list 310 of entities. It can be seen in FIG. 3C that list 310 is currently sorted by estimated close date. This is given by way of example only.

Figure 3C:
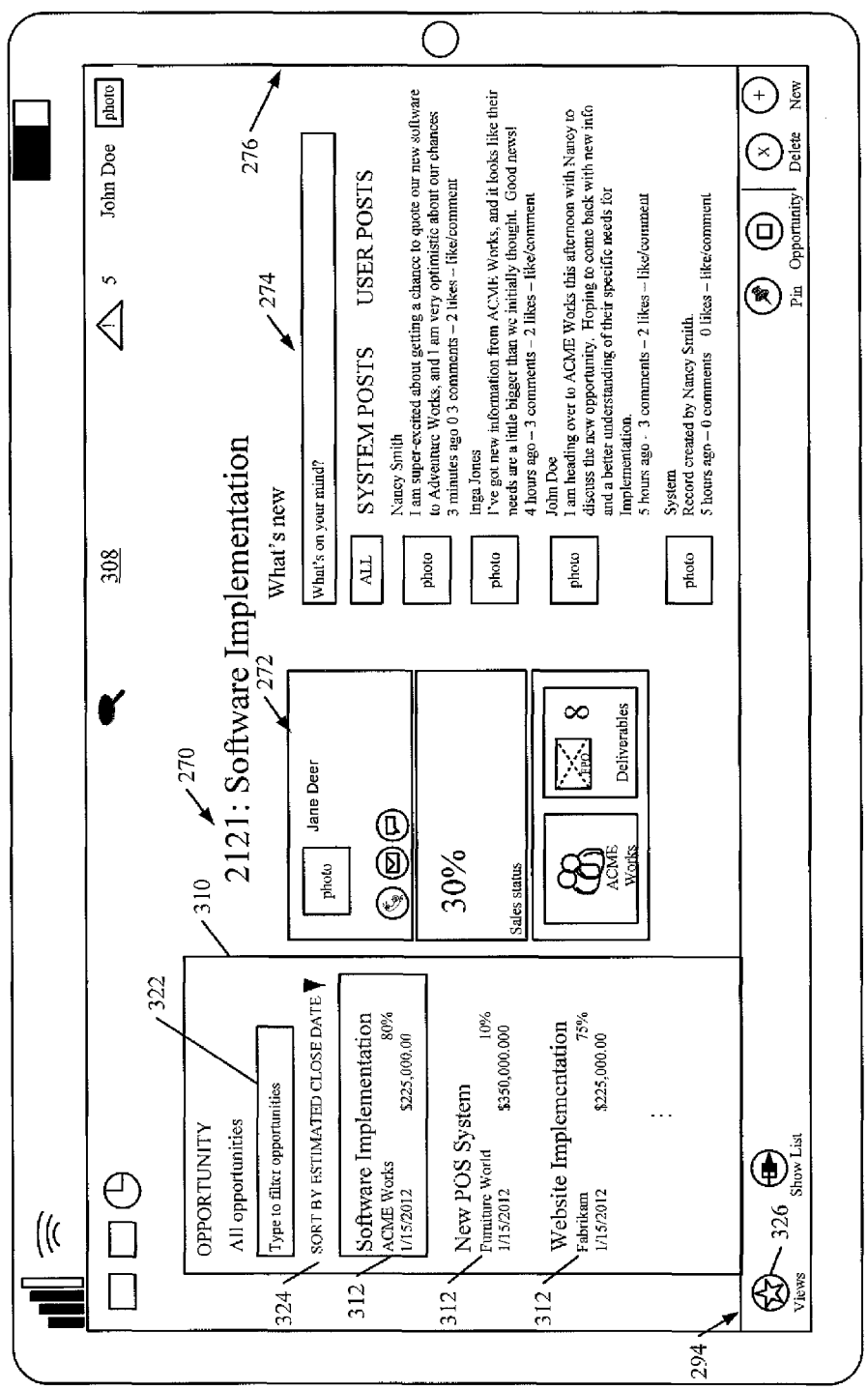

FIG. 3C also shows that application bar 294 includes view control 326. When the user actuates view control 326, visualization component 114 changes (or filters) the data currently being shown. If the user again actuates show list control 296, visualization component 114 returns the user to viewing the entity hub display 266 shown in FIG. 3B. Thus, it can be seen that the user can toggle between the list view 308 and the entity hub display 266 by repeatedly actuating control 296.

Figure 3D:
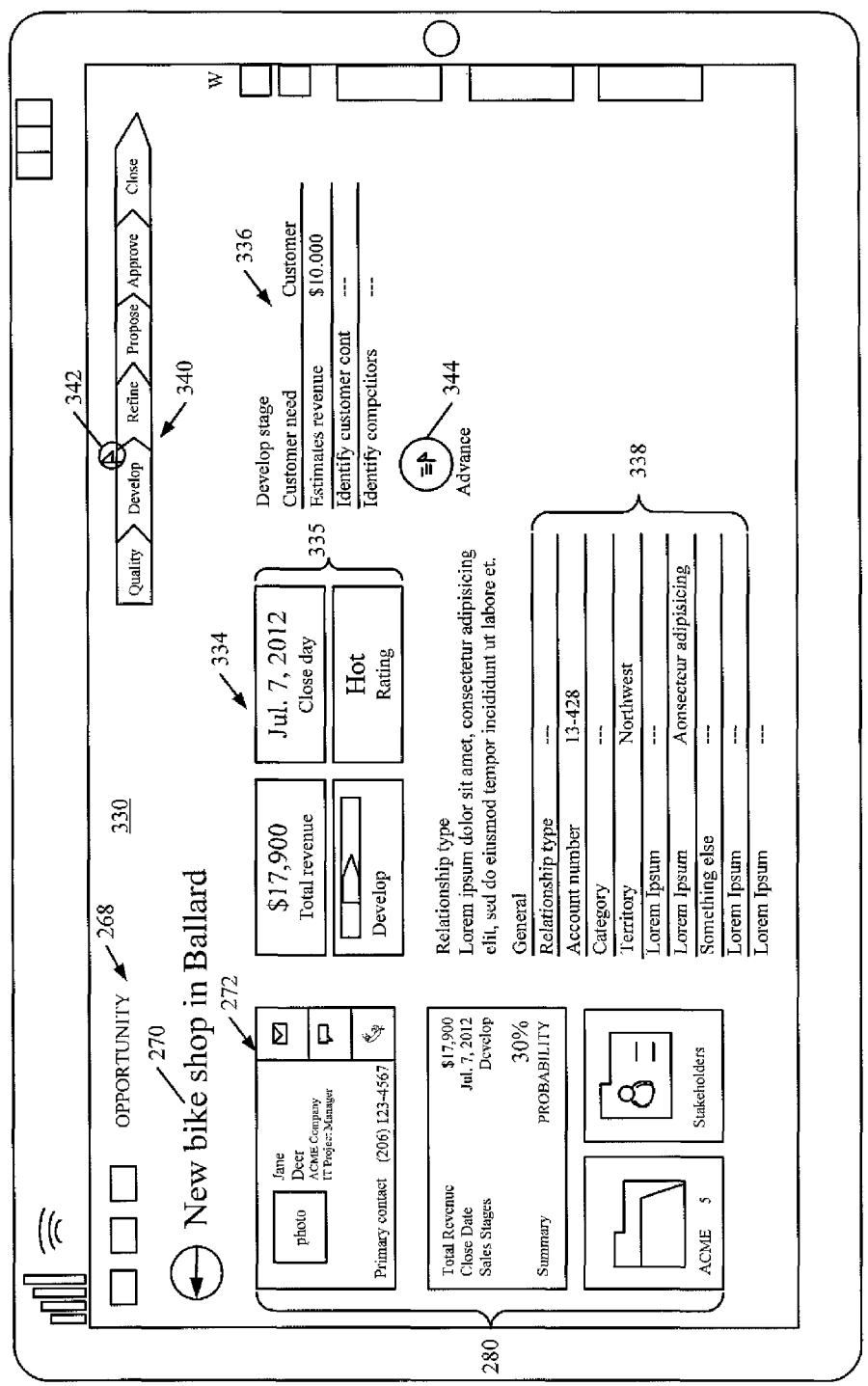

FIG. 3D shows another embodiment of an entity hub display 330. As with other embodiments, entity hub display 330 can illustratively have a caption section 268, a title section 270, a key information section 272 that includes a set of tiles 280 and a plurality of additional sections. In the embodiment shown in FIG. 3D, entity hub display 330 includes a details section 334, and a develop stages section 336. It can be seen from FIG. 3D that details section 334 includes a plurality of different kinds of components including a set of tiles 335, and a list 338. Thus, it can be seen that each section can include multiple different types of components. Those shown in FIG. 3D are for the sake of example only.

Further, stages section 336 includes a check list. When the user has performed a given item in the list, the user can illustratively place a check by that item in the checklist.

Also, entity hub display 330 illustratively includes a stages display 340. Stages display 340 illustratively includes a set of stages, along which a given business record (or entity) travels, from beginning to end. By way of example, the entity may be opened as a lead. If the entity is a lead, this may require the user 106 or another person to qualify the subject company or organization to determine whether they are even a business opportunity for the organization employing business system 100.

Once the lead has been qualified, the entity can be transferred or changed to an opportunity entity. The opportunity entity may go through multiple different stages, such as a develop stage and a refine stage. In the develop stage, user 106 may illustratively be obtaining additional information, putting together a team to address the business opportunity, etc. During the refine stage, the user may be interacting with the organization represented by the opportunity entity to obtain information in order to generate a quote entity. Once the business opportunity has been refined, the user 106 may illustratively generate a quote entity that represents a quote which can be proposed to the customer and approved by the customer. Finally, once a sale is completed, the opportunity entity can be closed.

It can be seen that each of these different stages is represented along display 340. Display 340 illustratively includes a location indicator 342 that indicates where, on stages display 340, the underlying entity represented by entity hub display 330 resides. If the user wishes to advance the underlying entity to the next stage, the user can actuate a suitable user input mechanism, such as advance mechanism 344. When this occurs, visualization component 114 illustratively moves location indicator 342 to the next stage on stages display 340. Visualization component 114 also illustratively updates the entity hub display 330 to include appropriate information, based upon the new location. For instance, if the underlying entity is moving from the develop stage to the refine stage, then the entity hub display 330 may illustratively include additional information fields which represent information that needs to be gathered or input by user 106 before the user can generate a quote or proposal for a customer. Receiving the stage modification input (such as the actuation of mechanisms 344) is indicated by block 350 in the flow diagram of FIG. 2, and generating the updated entity hub display based on the stage modification input is indicated by block 352.

It can thus be seen that the entity hub display displays a variety of different parts of an underlying entity for a user, based upon the user's role. The information can be grouped into sections according to the type of information, or the tasks performed by a user in the given role, and each section can have one or more components. Each component can be one of a variety of different component types, and illustratively represents an item of information from the underlying entity or data record. The user can illustratively pan the entity hub display to view all of the different sections, and can scroll vertically within a section to view all components in that section. The user can interact with the components to view more detailed information, to navigate to other information or entities, to performs tasks or activities, to customize the entity hub display, to delete components or sections, add components or sections, reorder them, or perform other operations, etc.

Figure 4:
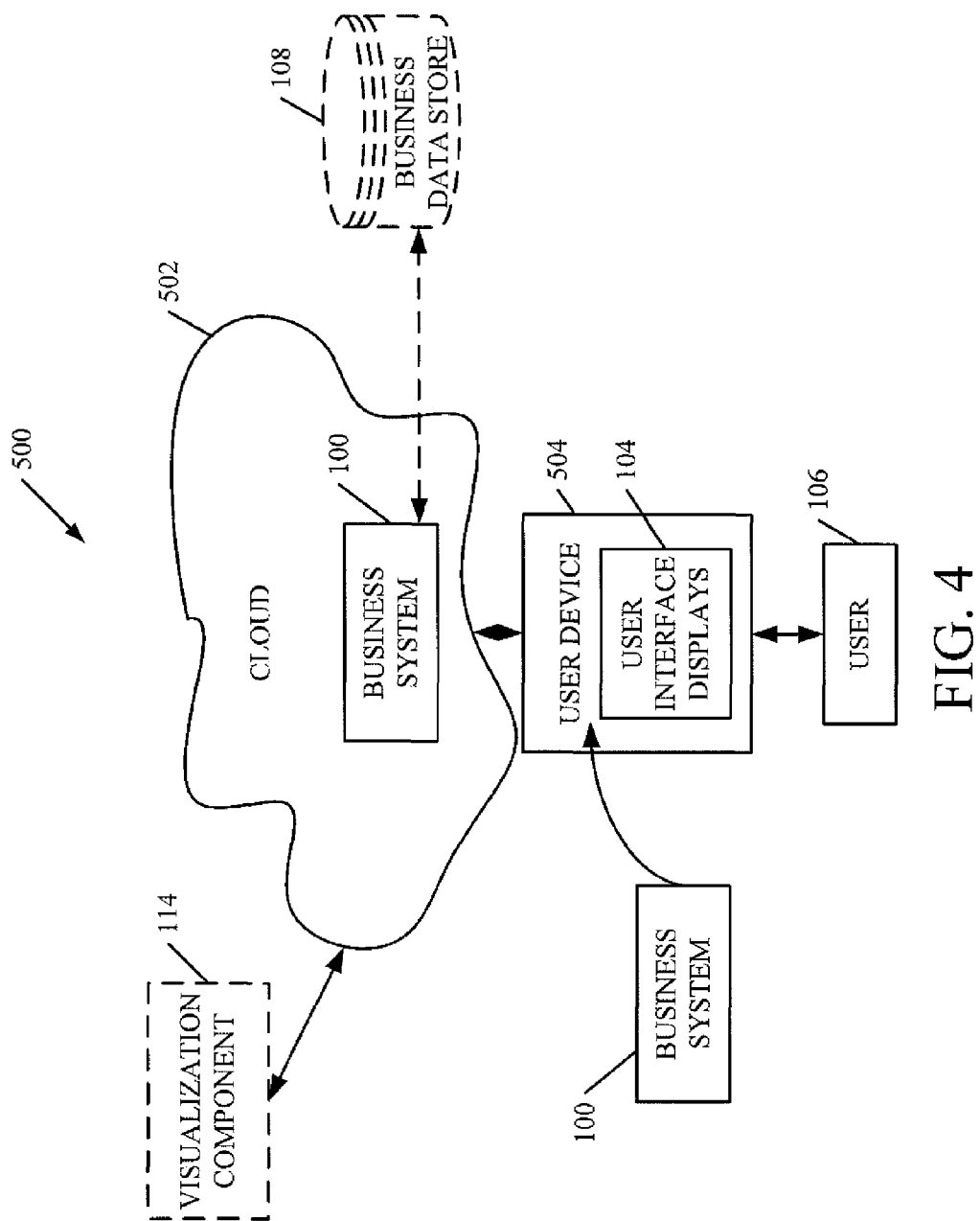
FIG. 4 is a block diagram showing the system of FIG. 1 in various architectures.

FIG. 4 is a block diagram of business system 100, shown in FIG. 1, except that it's elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that business system 100 is located in cloud 502 (which can be public, private, or a combination where portions are public while others are private). Therefore, user 106 uses a user device 504 to access the system through cloud 502.

FIG. 4 also depicts another embodiment of a cloud architecture. FIG. 4 shows that it is also contemplated that some elements of system 100 are disposed in cloud 502 while others are not. By way of example, data store 108 can be disposed outside of cloud 502, and accessed through cloud 502. In another embodiment, visualization component 114 is also outside of cloud 502. Also, some or all of system 100 can be disposed on device 504. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
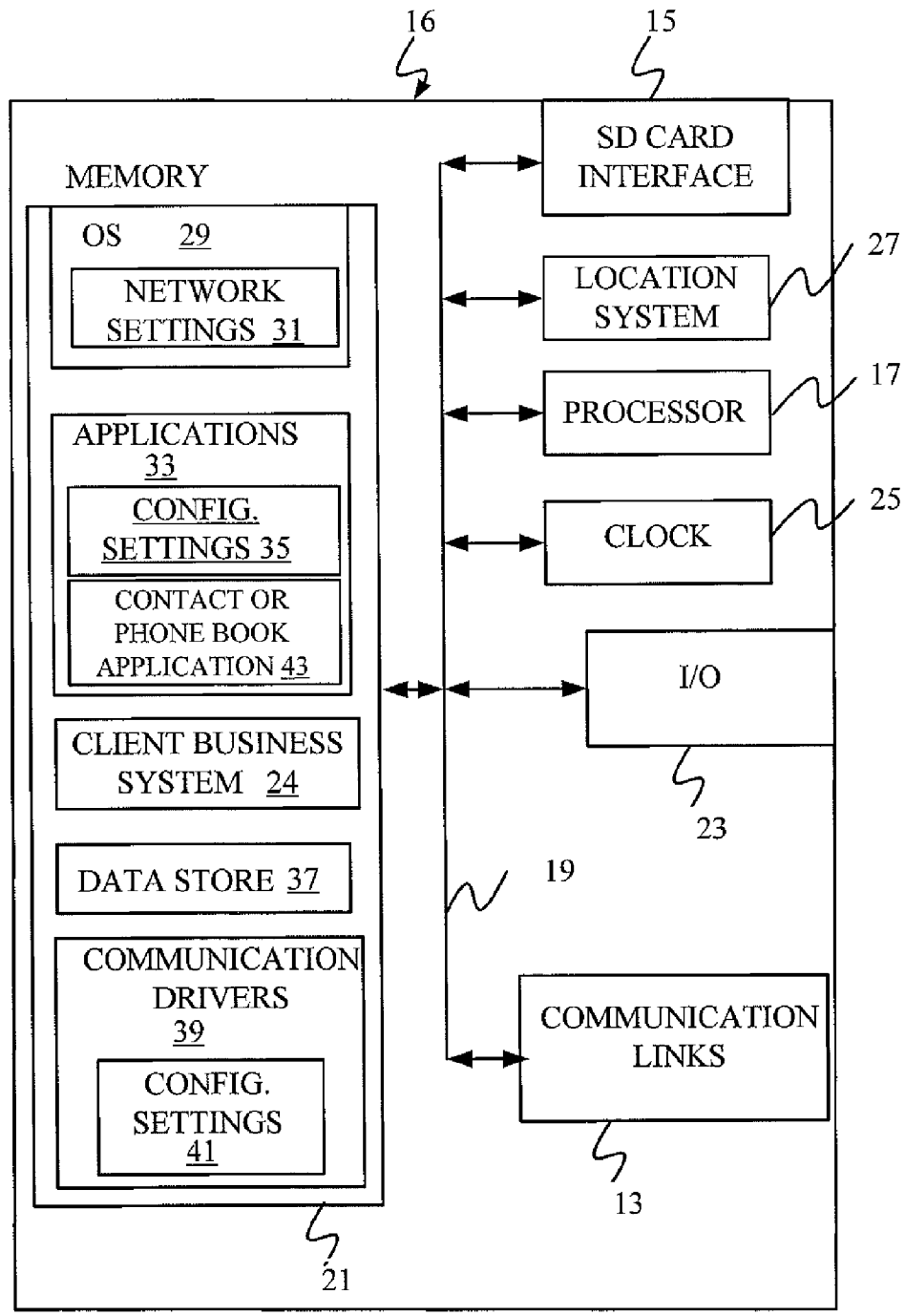
FIGS. 5-10 show different embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-9 are examples of handheld or mobile devices.

FIG. 5 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 112 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
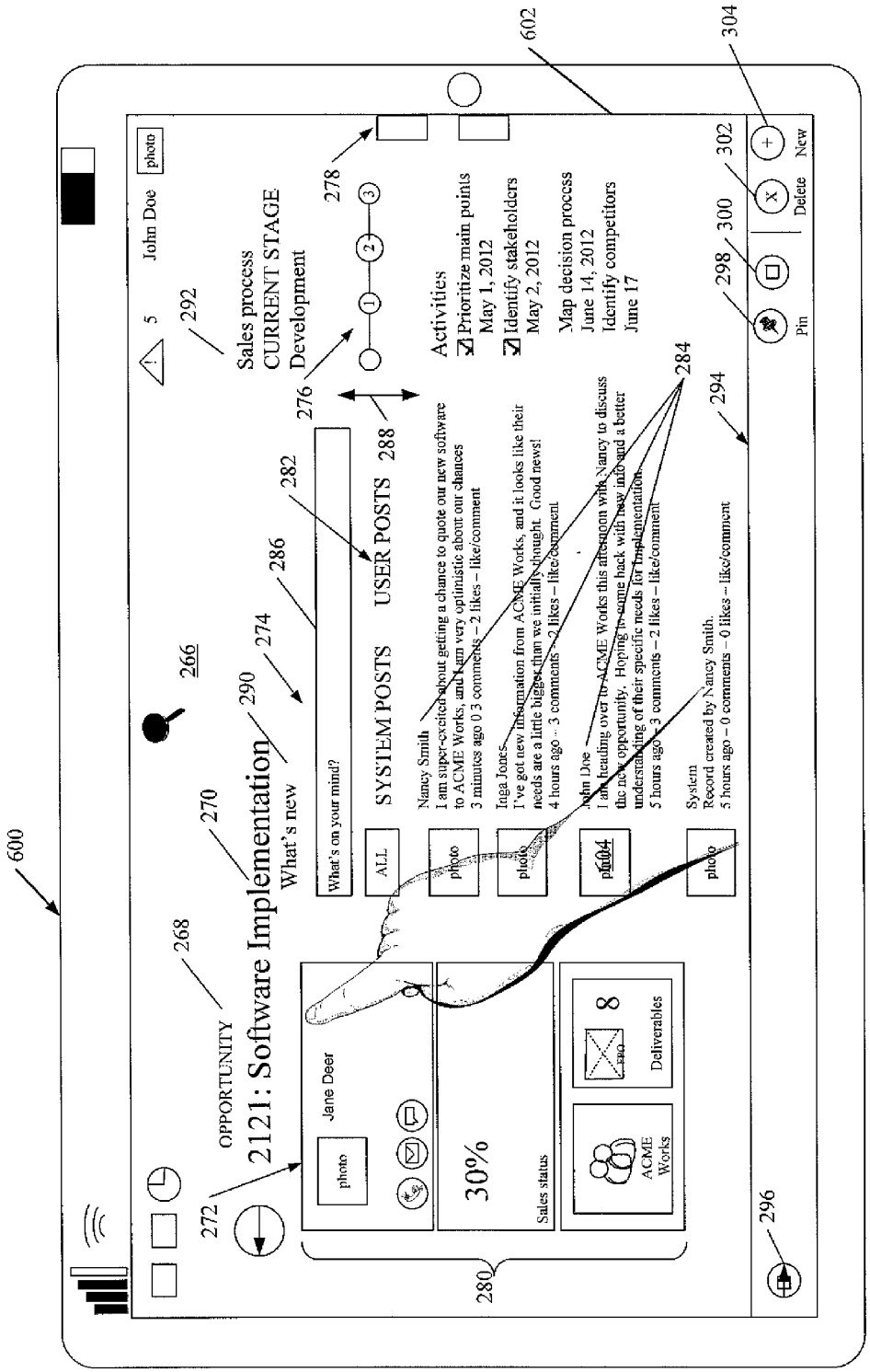

FIG. 6 shows one embodiment in which device 16 is a tablet computer 600. In FIG. 6, computer 600 is shown with user interface display from FIG. 3B displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
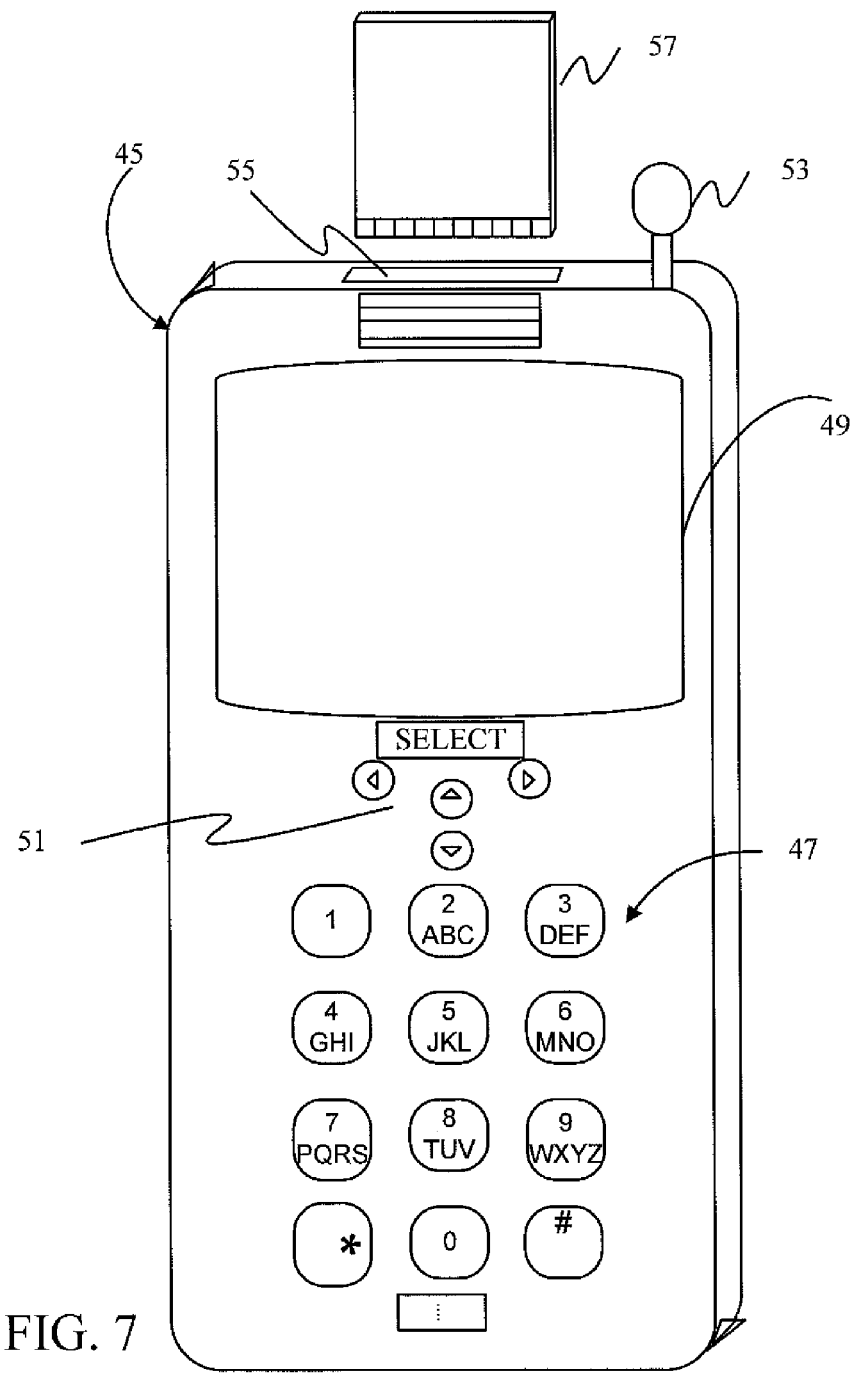
Figure 8:
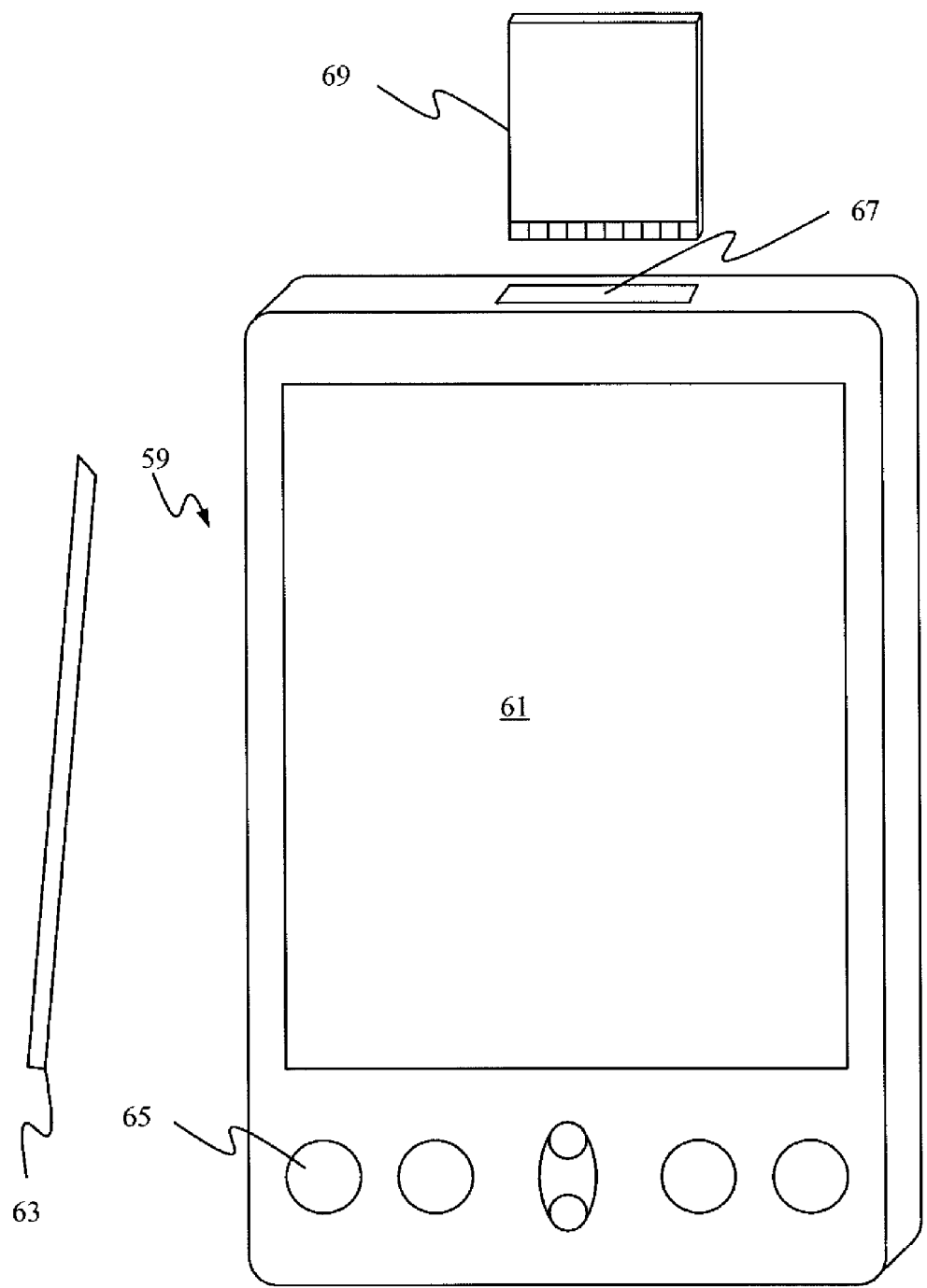

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
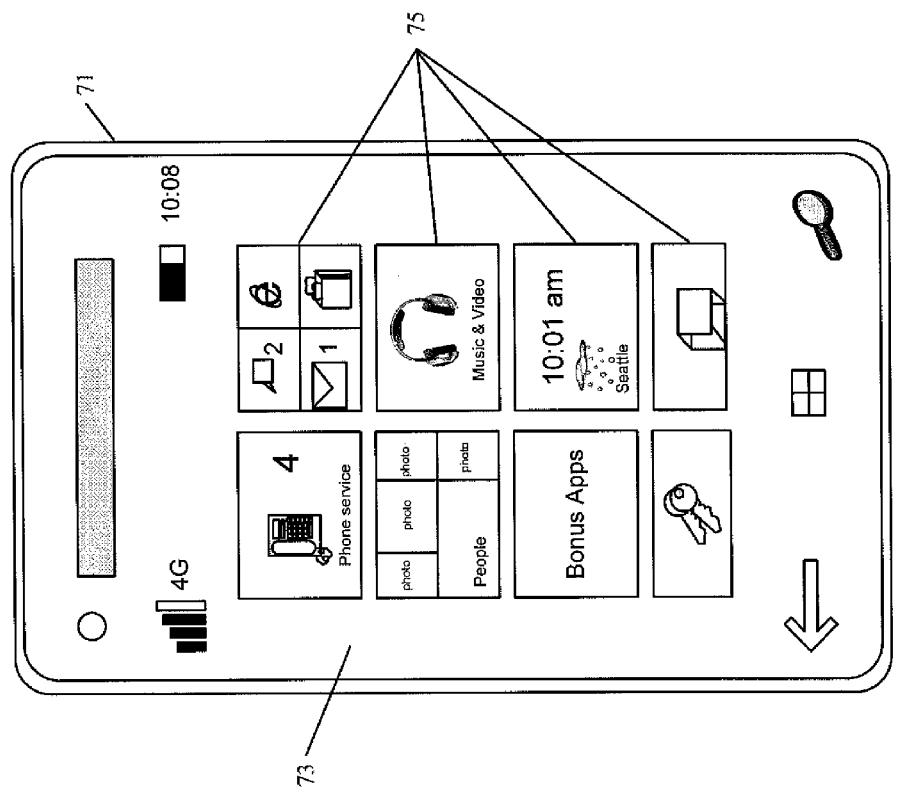
Figure 10:
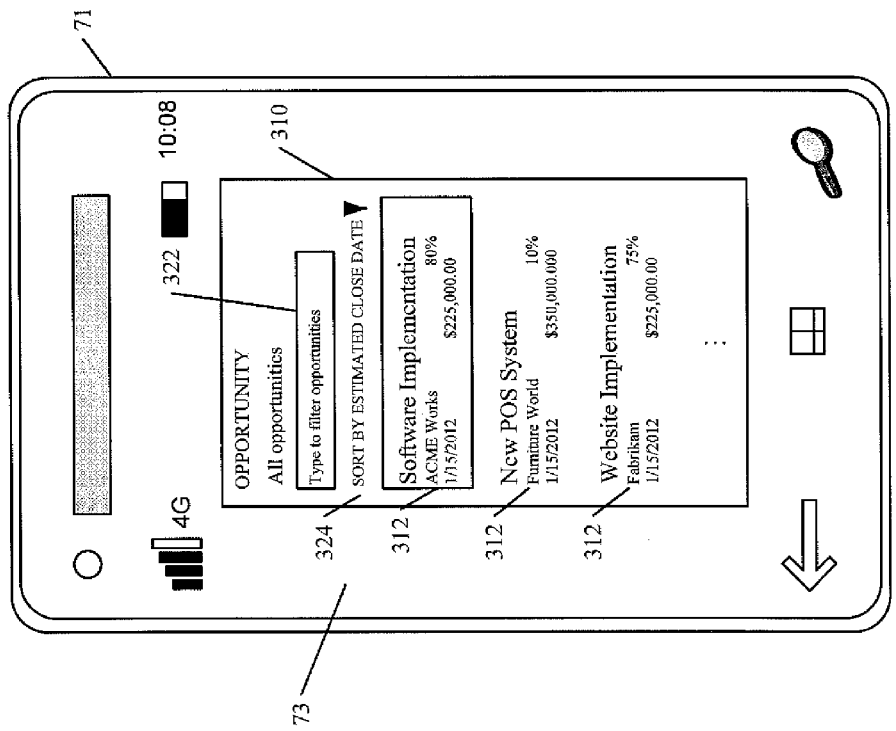

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows smart phone 71 with part of the display of FIG. 3C on it.

Note that other forms of the devices 16 are possible.

Figure 11:
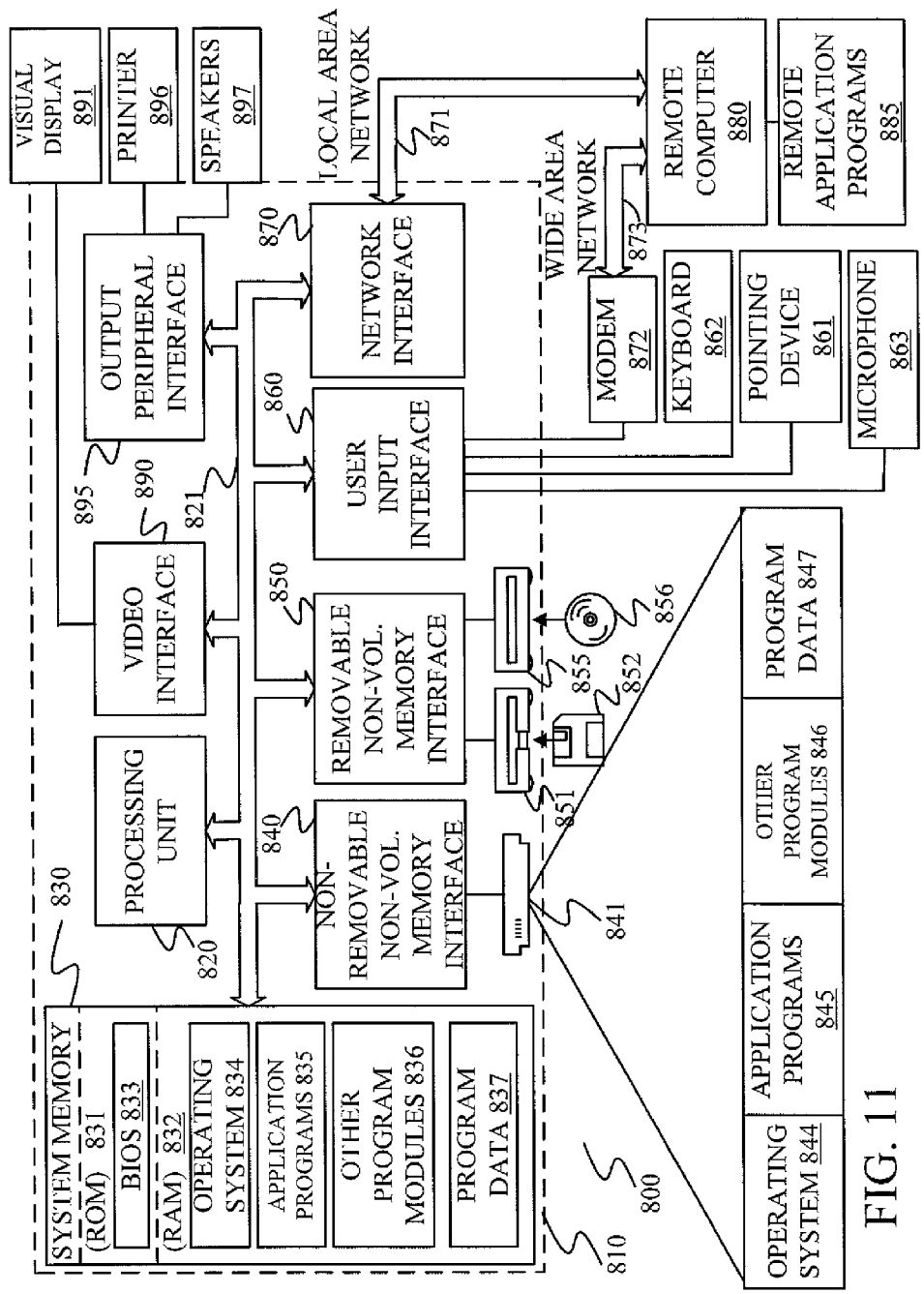
FIG. 11 is a block diagram of one illustrative computing environment.

FIG. 11 is one embodiment of a computing environment in which system 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 112), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method, comprising:
 displaying a user interface display to receive an entity hub request user input; and
 in response to the entity hub request user input, displaying a role tailored entity hub display on a display screen having a width, the role tailored entity hub display having an application bar with a plurality of controls displayed thereon and being a horizontally scrollable panoramic display to allow a portion of the role tailored entity hub display beyond the width of the display screen to be scrolled into view, the role tailored entity hub display, representing an underlying entity in a business computer system, that has sections of components arranged based, at least in part, on importance, each section corresponding to a different part of data in the underlying entity, wherein one section includes a dynamic tile that, when actuated by a user, navigates to an underlying detailed display that represents more detailed information corresponding to the dynamic tile, each component having a user actuatable interface element and representing a corresponding item of data in the part of the underlying entity corresponding to the section to which the component belongs;
wherein one of the plurality of controls comprises a list view control;
receiving an interaction user input comprising actuation of one of the plurality of controls on the entity hub display; and
performing an action on the entity hub display based on the interaction user input, wherein the action includes displaying a list of entity links to all entities in the business computer system having a same entity type as the underlying entity represented by the entity hub display, each link linking to a corresponding entity, wherein the list entity links is displayed on top of the entity hub display, the entity hub display being scrollable horizontally to visually move beneath the list of entity links without obscuring the list of entity links.

2. The computer-implemented method of claim 1 wherein each section has a width, and wherein section width varies with importance of information in the section.

3. The computer-implemented method of claim 1 wherein another user actuation of the list view control switches back to displaying the entity hub display without the list of entity links.

4. The computer-implemented method of claim 1 and further comprising:
receiving user actuation of an entity link; and
in response, displaying a different role tailored entity hub display representing the entity corresponding to the user-actuated entity link.

5. The computer-implemented method of claim 1 wherein displaying the entity hub display comprises:
displaying a stages display that indicates a progression of entity stages and a location indicator indicating a current location of the underlying entity represented by the entity hub display; and
displaying a stage advance control, actuation of which advances the location indicator to a next stage along the stages display.

6. The computer-implemented method of claim 5 wherein receiving an interaction user input comprises:
receiving a user actuation of the stage advance control; and
in response, advancing the location indicator to the next stage, and updating the entity hub display to include information associated with the next stage.

7. The computer-implemented method of claim 1 wherein the dynamic tile has a surface that is updated with new content from the underlying entity.

8. The computer-implemented method of claim 1 wherein importance of one of the sections is related to a frequency with which users interact with the one of the sections.

9. The computer-implemented method of claim 1 wherein receiving the interaction user input comprises:
receiving a new entity user input; and
creating a new entity, related to the underlying entity, based on the new entity user input.

10. A computer system, comprising:
a display device having a viewable screen with horizontal confines;
a process component that runs workflows for the computer system, the workflows including generating user interface displays to receive user inputs to perform tasks in the computer system, the computer system having roles assignable to users;
a visualization component that displays an entity hub display on the display device, the entity hub display, representing an underlying entity in the computer system, having a plurality of displayed components grouped into sections, the displayed components representing data items in the underlying entity that are related to a role of a user that accesses the entity hub display, the sections each representing a set of related data items, the entity hub display being displayed as a panoramic horizontally scrollable display to allow a section of the entity hub display beyond the horizontal confines of the display screen to be scrolled into view;
wherein the entity hub display comprises an application bar with a plurality of controls that are contextual to the underlying entity, each control being configured to perform a different action to the underlying entity and wherein the entity hub display includes a list view control that is configured to receive user actuation and display a list of entity links to all entities in the computer system having a same entity type as the underlying entity represented by the entity hub display, each link linking to a corresponding entity, and wherein the list of entity links is positioned on top of the entity hub display and wherein the entity hub display is scrollable horizontally to visually move beneath the list of entity links without obscuring the list of entity links; and
a computer processor, being a functional part of the system and activated by the process component and the visualization component to facilitate running workflows and displaying the entity hub display.

11. The computer system of claim 10 wherein the computer system comprises a business system and wherein the underlying entity has an entity type and represents a business record.

12. A computer readable storage medium storing computer readable instructions which, when executed by a computer comprising a business system, cause the computer to perform a method comprising:
displaying a user interface display to receive an entity hub request user input;
in response to the entity hub request user input, displaying a role tailored entity hub display as a panoramic horizontally scrollable display on a display screen having a width, the role tailored entity hub display being scrollable to allow a section of the role tailored entity hub display to be scrolled into view, the entity hub display representing an underlying entity that comprises a business record in the computer system, that has an entity type display and an entity name display, the entity hub display further comprising a list view control, and wherein the sections of components are arranged based, at least in part, on importance, each section corresponding to a different part of data in the underlying entity, each component representing a corresponding item of data in the part of the underlying entity corresponding to the section to which the component belongs; and receiving user actuation of the list view control; and displaying a list of entity links to all entities in the business system having a same entity type as the underlying entity represented by the entity hub display, each link linking to a corresponding entity, wherein displaying the list of entity links comprises displaying the list of entity links on top of the entity hub display, the entity hub display being scrollable horizontally to visually move beneath the list of entity links without obscuring the list of entity links.

* * * * *